Figure 1:
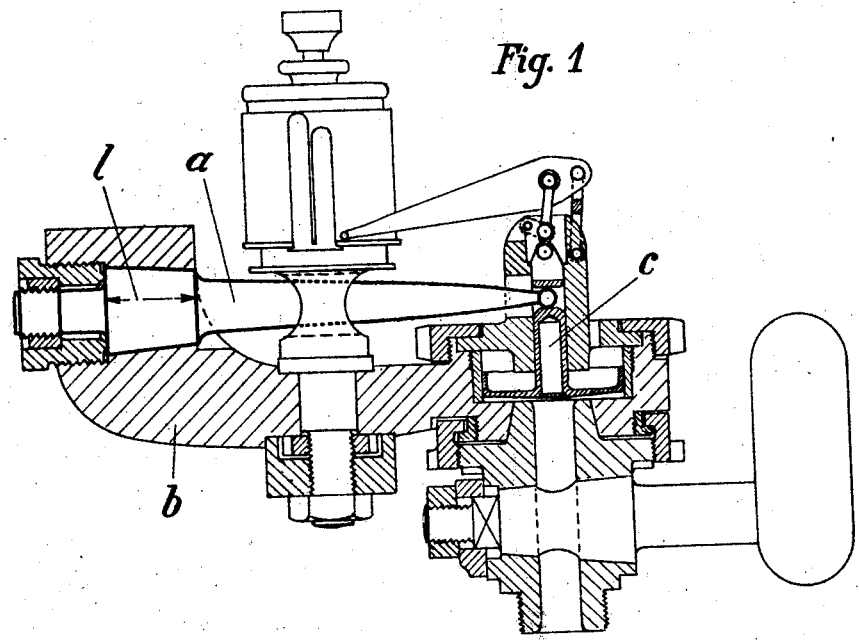

July 20, 1926.

A. A. VON GEHLEN

SPEED INDICATOR

Filed Dec. 12, 1924

1,592,876

Section 1-1    Section 2-2

Inventor:
Alfred August von Gehlen

By Richards, Geier
Atty.

Patented July 20, 1926.

1,592,876

UNITED STATES PATENT OFFICE.

ALFRED AUGUST VON GEHLEN, OF HAMBURG, GERMANY.

SPEED INDICATOR.

Application filed December 12, 1924, Serial No. 755,358, and in Germany November 8, 1923.

The possibility of using indicators for high speeds of rotation is mainly limited by the forces of the masses. In the direction of the ordinates, of the pressure, the masses of the reciprocating parts lead to the known waves at high speeds of rotation, in the direction of the abscissa, of the path of the engine piston, the mass of the paper drum and the masses co-operating therewith, may lead to inaccuracies in the diagram. This short statement by W. Wilke is fully explained by him in his "Untersuchungen über die grenzen der verwendbarkeit des indikators bei schnellaufenden maschinen für elastische medien" (researches in respect of the limits of use of the indicator in rapidly running machines for elastic media) published in the Oelmotor (oil motor) year 5 volumes 5 and 6. It is therefore not deemed necessary to give herein any further detailed theoretical explanations of this theory.

Hitherto, attempts have been made to render indicators capable in use for high speeds of rotation of engines, mainly by reducing the masses oscillating to and fro without deviating from the usual central construction of the separate parts. As in this manner it has only been possible to reduce the weights to a determined degree, optical indicators were constructed for such cases. As is well known these however are not only complicated and expensive but the minute diagrams cannot be reviewed except with a photographic enlargement. The applicant has endeavored by various experiments not only to reduce the masses but, by altering the usual construction to obtain a suitable apparatus and this has been obtained mainly by the following improvements.

In the drawing—

Figure 2:
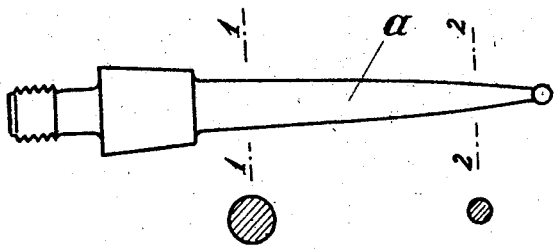

Figure 1 is a longitudinal section through an indicator showing the invention applied thereto, and Figure 2 is a side elevation of the spring member forming a part of the invention.

The indicator spring, in the form of a spiral spring as hitherto used, is no longer suitable for high speeds of rotation above 2000 per minute by reason of the slight oscillations of the spring (see the work of W. Wilke). In order to meet this difficulty the spiral spring is replaced by a rod shaped spring $a$, as will be seen in the accompanying drawing, of the same or substantially the same rigidity and of suitable, preferably circular, cross section. This spring, contrary to previous constructions, is secured outside the piston axis, for example in an arm $b$ of the indicator casing. Its reduced end engages, for example, in a recess of the piston rod $c$. In this manner the reduced mass of the spring falling along the piston axis becomes extremely small. The reduction of the force of the masses produced in this manner enables the indicator not only to be used at considerably above 2000 strokes but the size of the diagram which is drawn may be chosen so large that the course of the diagram can be well followed with the naked eye which, as already explained, is not the case for example with optical indicators. It will be understood that the rod shaped spring can also be used in optical indicators. By the choice of a rod-shaped spring in the present form, in place of a clamped blade spring, there is also obtained the advantage that the spring can be secured by means of a cone which can be constructed mechanically in the simplest manner without difficulty and which is readily releasable. This is important because the exchange of the springs of different strengths must not cause greater difficulties than that of the ordinary spiral spring. The conicity of the securing cone would for example be exactly the same in all apparatus and only the length $l$ of the cone would be different according to the length of the spring.

A further feature in such high speed indicators, for improving the record of the diagram and thus judging the lines of the pressure stroke, is to make the length of the diagram in proportion to the height considerably larger than usual so as to record more clearly the fine points of the pressure stroke, particularly during the main period of the working operation, which cannot otherwise be followed in the small diagrams. In such diagrams it is frequently not possible to determine whether the fluctuations in the diagram have been caused by the natural oscillations of the indicator or by the pressure stroke. For the above purpose the drum of the indicator is made as light in weight as possible and the proportion of the drum diameter to the height is greater than 1 so that with a suitable arrangement of the driving mechanism for the drum, a diagram length is obtained which is at least four times the height of the diagram. Drums with a height less than the diameter have only been used for recording time diagrams but not in the usual drums driven by the engines. Indicator diagrams with a proportion of length to height equal or greater than 4 cannot receive records from the usual indicators.

Having now particularly described and ascertained the nature of my said invention and in what manner the same is to be performed, I declare that what I claim is:—

1. An indicator including in combination, a casing, a piston in said casing, an arm extending from said casing and having a bearing portion out of alignment with the longitudinal axis of said piston, and a rod-shaped spring in the form of a tapered rod of substantially uniform strength throughout, the reduced end of the spring being connected with the piston rod while the enlarged end thereof is conical and removably secured in said bearing portion outside the piston axis.

2. An indicator including in combination, a casing, a piston in said casing, an arm extending from said casing and having a bearing portion out of alignment with the longitudinal axis of said piston, and a tapered rod-shaped spring of uniform strength throughout having a longitudinal cross section of parabolic form and in which every cross section has a constant moment of flexure and a constant moment of resistance, the reduced end of said spring being connected with said piston rod while the enlarged end thereof is secured in said bearing portion outside the piston axis.

In testimony whereof I have signed my name to this specification.

ALFRED AUGUST von GEHLEN.